Oct. 1, 1946.    F. BIEHL ET AL    2,408,365
SELF LOCKING GEARING
Filed Jan. 31, 1944

INVENTOR
FRED BIEHL
EDWARD O. THOMPSON
BY
Wheeler, Wheeler & Wheeler
ATTORNEYS.

Patented Oct. 1, 1946

2,408,365

UNITED STATES PATENT OFFICE 2,408,365

SELF-LOCKING GEARING

Fred Biehl and Edward O. Thompson, Peshtigo, Wis.; said Biehl assignor to said Thompson Application January 31, 1944, Serial No. 520,396

3 Claims. (Cl. 74—413)

This invention relates to improvements in self-locking gearing.

It is a primary object of the present invention to provide a pinion and gear set of simple form which will permit motion to be transmitted with the utmost facility from the pinion to the gear, but which will automatically lock itself, regardless of the position in which the pinion is left, to preclude any transmission of motion from the gear to the pinion.

More specifically, it is an object of the invention to achieve a self-locking pinion and gear set without duplication of the parts. We are aware of the fact that attempts have been made in the past to provide self-locking gear sets but, so far as we are aware, only partial success has been achieved and then, only by constructions in which a dual gear and a split or dual pinion are required. As will hereinafter be explained, we use a ring gear in order that the interdental spaces may diverge rather than converge, and we use a peculiar form of gear tooth in the ring gear so that, notwithstanding the use of roller pinion teeth, which operate with a minimum of friction, we are able not only to achieve the necessary clearances and the desirable ease of operation but to assure the positive locking of the gear regardless of the position in which the operator may cease to rotate the pinion.

Other objects will be apparent upon analysis of the following disclosure.

In the drawing.

Like parts will be identified by the same reference characters throughout the several views.

Figure 1:
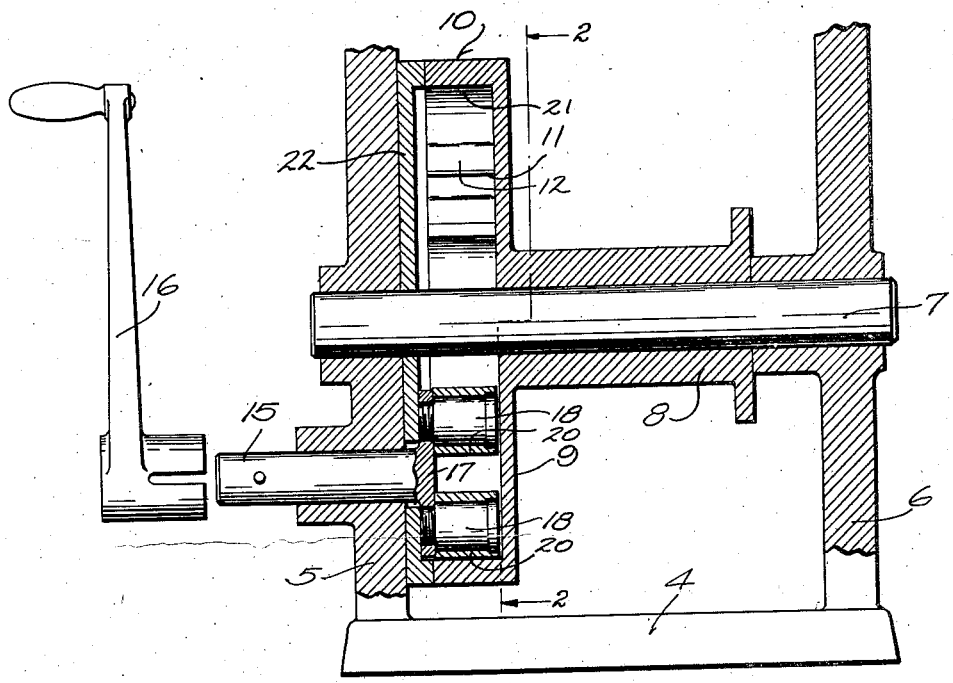
Figure 1 is a diagrammatic view partially in section and partially in side elevation showing our invention incorporated in a hoist.

While our invention has particular advantages as applied to a hoist, it may also be used wherever a self-locking gear set is desired. The hoist illustrated is of simple construction in which the base 4 carries standards 5 and 6 which support a shaft 7 upon which the drum 8 is mounted for rotation. The flange 9 at one end of the drum 8 carries a ring gear 10 and teeth 11, each of which, adjacent its apex, is preferably beveled at 12.

Journaled in the standard 5 is a pinion shaft 15 to which power may be applied in any desired manner, as by the crank 16. The head 17 at the inner end of shaft 15 is provided at either side of the shaft axis with studs 18 screwthreaded to the head and rotatably supporting the rollers 20. The rollers are receivable into the interdental spaces 21 of the ring gear and act as teeth to transmit motion from the pinion shaft to the ring gear and thence to the drum 8. A closure 22 may be applied to the otherwise open side of the ring gear to enable the lubricant to be retained therein.

As the pinion shaft 15 is rotated, the rollers 20 will be alternately caused to enter successive interdental spaces 21 in the ring gear. The rollers will act on the beveled faces of successive teeth 11 in entering and leaving such spaces. There is clearance for the rollers only because the radial center lines drawn between successive teeth through the interdental spaces 21 are divergent, due to the fact that gear 10 is a ring gear. If gear 10 were a spur gear, the pinion teeth would have to enter the interdental spaces along lines which would be convergent and there would not be clearance such that the teeth could be mounted in the same plane. The prior art attempted to solve this problem by providing the gears and pinions in dual organizations.

It will be noted that the dedendum circle to which the tips of the teeth 11 extend, passes through the projection of pinion shaft 15 close to the axis thereof. If the axis of the pinion shaft were remote from the circle represented by the tips of the gear teeth, the gear set could not be self-locking.

It is not essential that the circle drawn through the tips of the gear teeth should exactly intersect the axis of the pinion shaft because of the provision of the beveled surfaces 12 which converge toward the tips of the respective teeth. These beveled surfaces exert a camming action on the rollers 20 and, as will be observed in Figure 3, the camming action is exerted upon the respective rollers in directions tending to produce opposite rotation of the pinion shaft.

Figure 2:
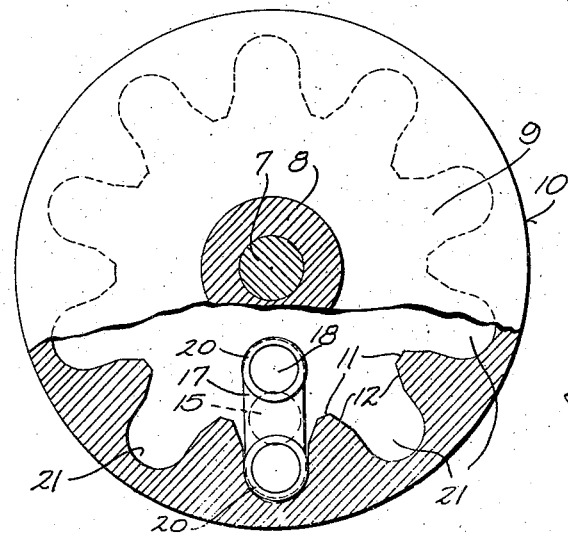
Figure 2 is a view taken in section on the line 2—2 of Figure 1.
Figure 3:
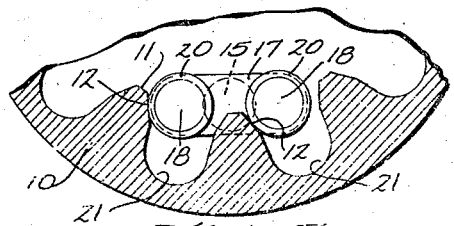
Figure 3 is a fragmentary detail view similar to Figure 2 showing the pinion in the locking position which it assumes to resist any tendency of the gear to rotate.

Figure 3 shows the parts in the position they assume when the gear 10 tends to rotate counterclockwise. The beveled surface 12 which engages the pinion roller 20 which is at the right in Figure 3 tends to rotate the pinion shaft 15 counterclockwise while the beveled surface which engages the pinion roller at the left in Figure 3 is tending to rotate the pinion shaft clockwise. Since the forces exerted by the respective bevels upon the respective rollers are equal and opposite, the gear locks. It is an important feature of the invention that the gear will lock itself in like manner regardless of the direction in which the gear 10 tends to rotate and regardless of the position in which the pinion shaft is left. Unlike some devices of the prior art, it is not necessary to leave the pinion in a particular position in order to achieve the self-locking result. The position least favorable to self-locking action is that illustrated in Figure 2 where the pinion rollers 20 lie upon a common radius of the ring gear. Obviously, the entire force exerted by the ring gear upon the pinion will be exerted on a single roller and will tend to initiate high speed rotation of the pinion and pinion shaft. Even in this extreme case, however, as soon as the pinion reaches the position shown in Figure 3, it will lock and will not yield to any further motion initiated by the ring gear.

On the other hand, the lock can be released by the slightest pressure applied directly to the pinion shaft. In actual practice, a hoist made in accordance with disclosure of Figure 1, loaded to its full capacity of about 2000 pounds, will hold its load in any position without a brake, but can be lowered without using the crank by simply rotating the pinion shaft by hand.

Of course, in order to lift the load, the crank would be used, but the roller teeth of the pinion minimize the friction. While it is recognized that such teeth are old per se, they have not heretofore been used in any self-locking gear because most self-locking gears depend measurably upon friction to achieve the desired result. The present gear accomplishes its self-locking function mechanically, thereby enabling such anti-friction devices as the roller pinion teeth to be incorporated without destroying the self-locking effect.

We claim:

1. In a self-locking gear set, the combination with a pinion comprising a head rotatable upon a predetermined axis and provided at points spaced from said axis with axially projecting stud teeth revoluble about said axis in the rotation of said head, in combination with a ring gear mounted for rotation about a predetermined axis and in a plane which includes said pinion stud teeth, said ring gear comprising an annular series of inwardly projecting teeth with which the stud teeth of the pinion mesh, the ring gear teeth being spaced to provide interdental openings diverging substantially on radii of the ring gear and into which alternate teeth of the pinion are successively receivable, each ring gear tooth having inwardly converging beveled faces, said faces being so positioned as to correspondingly and simultaneously engage opposite teeth of the pinion when such teeth are disposed in a position such that a line drawn between them will lie substantially at right angles to a radius of the ring gear.

2. A self-locking but easily operable gear set comprising the combination with a ring gear mounted for rotation upon a predetermined axis and provided with an annular series of teeth and with interdental spaces diverging radially, each of said teeth having an apex and beveled side faces converging toward said apex, of a pinion provided with a head disposed at one side of the plane of the ring gear and mounted for rotation upon an axis close to and slightly within an imaginary circle connecting the apices of the several teeth of the ring gear, and studs projecting from said head at opposite sides of the axis of pinion head rotation, each of said studs being provided with an anti-friction roller, the respective studs and rollers constituting pinion teeth alternately engageable in the rotation of said head in successive interdental spaces of the ring gear, the beveled faces of the ring gear teeth being so disposed as to exert equal and opposite pressure moments upon the respective rollers of the pinion when the pinion rollers are in a position such that a line connecting their centers is substantially at right angles to a radius of the ring gear.

3. In a self-locking gear set the combination with a ring gear having inwardly projecting teeth provided near their inner ends with bevels, of a pinion comprising diagonally opposed teeth operatively connected to mesh with teeth of the ring gear, the axis of the pinion being slightly spaced inwardly from the path of movement of the ends of the ring gear teeth and the pinion teeth being simultaneously engageable by the beveled end portions of successive ring gear teeth with camming action exerting substantially equal and opposite rotative pressures upon the said pinion teeth when the relative loading of the gear and pinion is such that the gear tends to drive the pinion.

FRED BIEHL.
EDWARD O. THOMPSON.